April 8, 1952  J. LANGERMAN  2,592,042
HEATING PLUG
Filed Nov. 19, 1949
FIG.1
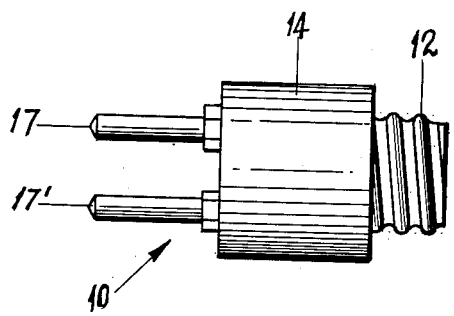
FIG.2
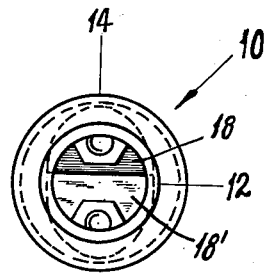
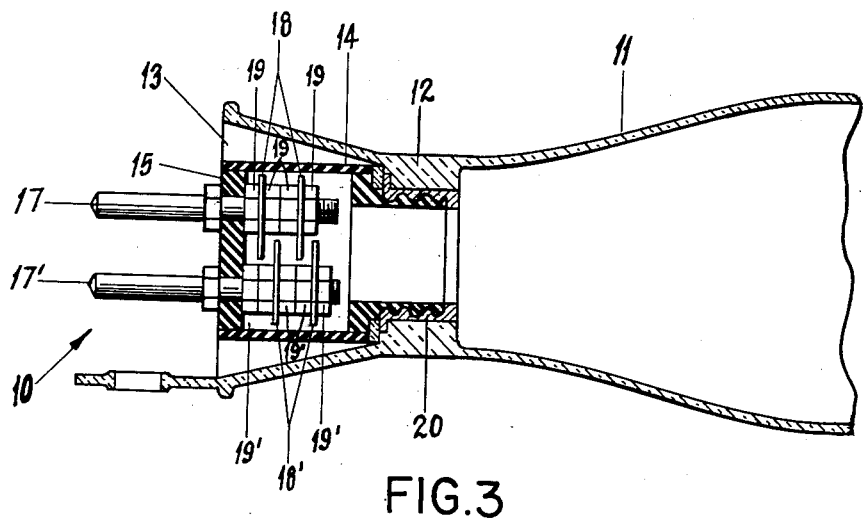
FIG.3
JONAS LANGERMAN
INVENTOR
BY
ATTORNEY Patented Apr. 8, 1952

2,592,042

UNITED STATES PATENT OFFICE 2,592,042

HEATING PLUG

Jonas Langerman, New York, N. Y.

Application November 19, 1949, Serial No. 128,425

3 Claims. (Cl. 219—40)

This invention relates to an electric heating plug designed for use in connection with a hot water bottle or other liquid container so as to heat the container and the water therein and to maintain the water at substantially constant temperature.

An object of this invention is to provide an electric heating plug which is portable and may be handled while electrically connected without danger to the user.

A further object of the invention is to provide an electrical heating plug for a hot water bottle which will maintain a constant temperature within the bottle and so render therapeutic service to the user.

Another object of this invention is to provide an electric heating plug for heating a liquid within a hot water bag, the device depending upon the conductive qualities of the water in which it is immersed to complete the electric circuit and so that there will be no heat generation within the heating electrodes when the electric heating plug is withdrawn from the water in the bag. Furthermore, while the plug is engaged in the hot water bag, and when the bag is not full of water, heating will take place only when the bag is kept in a substantially inverted position. If by inadvertence, the bag is forgotten with the electric current on, current will not be conducted between the electrode plates if the bag is in any position beyond other than that of a substantially inverted position, thereby bringing about an automatic cut-off of current.

Another object of this invention is to provide an electric heating plug which is constructed with thin platelike electrodes placed in closely spaced-apart relation and so that the length of the plug will be so reduced as to be confined with the neck portion of the hot water bag.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a side view in elevation of the plug.

Figure 2 is an end view of the plug shown in Figure 1.

Figure 3 is a fragmentary sectional view of the plug and heating element mounted in a hot water bottle.

In the illustrated embodiment of the invention, the numeral 10 indicates an electric heating plug designed to be threadedly secured to a hot water bottle 11. The plug 10 comprises a threaded sleeve 12 adapted to engage complementary threads within the neck 13 of the hot water bottle.

The plug 10 comprises a cylindrical body 14 integral with the threaded sleeve 12. The cylindrical body 14 and the threaded portion 12 are hollow, and this causes the interior of the plug to be exposed at the threaded end and to be in communication with water in the bottle.

A disk 15 fixed inside the cylindrical body 14 closes and seals the opposite end of the plug against leakage. Two electric contact prongs 17, 17' are mounted in the disk 15 and project outwardly from the disk. The contact prongs also extend inwardly into the cylindrical body 14. The contact prong 17 has electrode plates 18 secured to the internal end portion thereof.

The electrode plates 18 are spaced-apart by threaded nuts or spacers 19. The contact prong 17' has electrode plates 18' secured to the internal end portion thereof. The electrode plates 18' are space-apart by threaded nuts 19' or spacers.

The electrode plates on one prong extend toward the electrode plates on the opposite prong and are in superposed parallel relation and not in contact with each other.

The body of the plug is formed of suitable insulating material. The electrode plates are insulated from each other so that no current can pass therethrough when they are connected to a source of electrical supply, unless the electrode plates are submerged in a liquid.

When in operation, a temperature is reached which settles to a constant by reason of dissipation of heat from the surface of the bottle. Moreover, when the bottle is not full to capacity and assumes a flat or a fallen position through inadvertence, no conducting water is between the electrode plate 18 and 18' and hence no current at all flows and no additional heat is provided.

In accordance with the patent statutes I have described and illustrated the preferred embodiment of my invention, but it will be understood that various changes and modifications can be made therein without departing from the spirit of the invention as defined by the appended claims.

I claim:

1. A safety electric heating element for a hot water bag, comprising a hollow threaded plug having an integral cylindrical extension positioned above the threaded end of said plug, a disk closing the upper end of said cylindrical extension, a pair of contact prongs projecting from the top of said disk, said contact prongs extending inwardly of said cylindrical extension, electrode plates secured to the internal end portions of said prongs, the electrode plates of each prong being in spaced-apart relation, the electrode plates on one prong extending towards the opposite prong and in spaced-apart superposed relation between the electrode plates on said opposite prong, whereby water within said bag entering said hollow plug will cause electrical connection between opposed electrodes, said electric connection being broken in the absence of water.

2. A safety electric heating plug for a hot water bag, comprising a hollow threaded plug having a cylindrical extension positioned above the threaded end of said plug, said plug being open at one end and in communication with the water in said bag, a disk closing the upper end of said cylindrical extension, two electric contact prongs projecting from the top of said disk, said contact prongs extending inwardly of said cylindrical extension, electrode plates secured to the internal end portions of said prongs, the electrode plates of each prong being in spaced-apart relation, the electrode plates on one prong extending towards the opposite prong and being in superposed relation between the electrode plates on said opposite prong but out of contact therewith, whereby water within said bag entering said hollow plug will cause electrical connection between opposed electrodes, said electric connection being broken in the absence of water.

3. A safety electric heating plug for a hot water bottle, comprising a hollow threaded plug having a cylindrical body positioned in integral relation therewith, said threaded plug being open and in communication with the water in said bottle, a disk closing the opposite end of said cylindrical body, two electric contact prongs projecting from the top of said disk and extending inwardly of said cylindrical body, electrode plates secured to the internal end portions of said prongs, said electrode plates on said prongs being respectively in spaced-apart relation, the electrode plates on one prong extending towards the opposite prong and being in superposed relation between the electrode plates on said opposite prong and out of contact therewith, said electrodes being insulated from each other, whereby water within said bottle entering said hollow plug will cause electrical connection between opposed electrode plates, said electric connection being broken in the absence of water.

JONAS LANGERMAN.

REFERENCES CITED

The following references are of record in the file of this patent:

UNITED STATES PATENTS

| Number | Name | Date |
|---|---|---|
| 905,597 | Smyser | Dec. 1, 1908 |
| 1,400,646 | Webster | Dec. 20, 1921 |
| 1,584,106 | Levinson | May 11, 1926 |
| 1,696,146 | Anderson | Dec. 18, 1928 |
| 1,834,160 | Kise | Dec. 1, 1931 |